(12) United States Patent
Kamiya

(10) Patent No.: US 7,478,168 B2
(45) Date of Patent: Jan. 13, 2009

(54) DEVICE, METHOD AND PROGRAM FOR BAND CONTROL

(75) Inventor: Satoshi Kamiya, Tokyo (JP)

(73) Assignee: NEC Corporation, Tokyo (JP)

( * ) Notice: Subject to any disclaimer, the term of this patent is extended or adjusted under 35 U.S.C. 154(b) by 967 days.

(21) Appl. No.: 10/996,403

(22) Filed: Nov. 26, 2004

(65) Prior Publication Data

US 2005/0120090 A1    Jun. 2, 2005

(30) Foreign Application Priority Data

Nov. 27, 2003  (JP) ............................. 2003-397081
Nov. 22, 2004  (JP) ............................. 2004-338083

(51) Int. Cl.
*G06F 15/173* (2006.01)
(52) U.S. Cl. ...................... 709/238; 709/224; 709/226; 709/232; 709/249
(58) Field of Classification Search ................. 709/224, 709/226, 232, 238, 249, 250
See application file for complete search history.

(56) References Cited

U.S. PATENT DOCUMENTS

2002/0129140 A1* 9/2002 Peled et al. ................. 709/224

FOREIGN PATENT DOCUMENTS

| JP | 2003-266156 | 11/1991 |
|---|---|---|
| JP | 2003-125022 | 4/2003 |
| JP | 2003-283554 | 10/2003 |
| JP | 2003-283555 | 10/2003 |
| JP | 2003-283572 | 10/2003 |

OTHER PUBLICATIONS

An Office Action issued by the Japanese Patent Office on Jan. 16, 2007, with English language translation, pp. 1-4.
S. Maruyama et al. Management of E-Mail System at Academic Center for Computing and Media Studies, Kyoto University, Aug. 23, 2002, Information Processing Academic Association Research Report 2002-DSM-26-10, pp. 55-60.

* cited by examiner

*Primary Examiner*—Yves Dalencourt
(74) *Attorney, Agent, or Firm*—Whitham Curtis Christofferson & Cook, P.C.

(57) ABSTRACT

A band control device, a band control method and a band control program for regulating specific application level traffic autonomously so that network resources can be fairly utilized. In the band control device, an application processor checks the contents of application level data to detect regulation subject data. When regulation subject data has been detected, processes such as shutdown, band limitation and delay addition is performed for L3 traffic, an L4 connection and an application level transaction with respect to the regulation subject data. Thus, specific application level traffic is autonomously regulated so that network resources can be fairly utilized.

42 Claims, 12 Drawing Sheets

FIG. 6

| Item NO. | IP SA | IP DA | Protocol | SP | DP |
|---|---|---|---|---|---|
| 1 | A | * | TCP | * | 25 |
| 2 | * | A | TCP | 25 | * |
| 3 | B | * | TCP | * | 25 |
| 4 | * | B | TCP | 25 | * |
| . | . | . | . | . | . |
| . | . | . | . | . | . |

FIG. 7

| Item NO. | IP SA | IP DA | Protocol | SP | DP | Regulation Operation |
|---|---|---|---|---|---|---|
| 1 | A | * | TCP | * | 25 | Discard |
| 2 | * | A | TCP | 25 | * | Discard |
| 3 | B | * | TCP | * | 25 | Delay |
| 4 | * | B | TCP | 25 | * | Delay |
| 5 | * | C | TCP | * | 25 | Delay |
| 6 | C | * | TCP | 25 | * | Delay |
| . | . | . | . | . | . | . |
| . | . | . | . | . | . | . |
| L−1 | * | * | TCP | * | 25 | Relay |
| L | * | * | TCP | 25 | * | Relay |

FIG. 8

| Item NO. | IP SA | IP DA | Protocol | SP | DP | Email Address |
|---|---|---|---|---|---|---|
| 1 | * | * | TCP | * | 25 | aaa@bbb.com |
| 2 | * | * | TCP | 25 | * | aaa@bbb.com |
| 3 | A | * | TCP | * | 25 | ccc@ddd.com |
| 4 | * | A | TCP | 25 | * | ccc@ddd.com |
| . | . | . | . | . | . | |
| . | . | . | . | . | . | |

FIG. 9

| Item NO. | IP SA | IP DA | Protocol | SP | DP | TCP Connection Count | Email Address | Email Count | Regulation Operation |
|---|---|---|---|---|---|---|---|---|---|
| 1 | * | * | TCP | * | 25 | 100connection/sec | aaa@bbb.com | 100mail/sec | Discard |
| 2 | * | * | TCP | 25 | * | 100connection/sec | aaa@bbb.com | 100mail/sec | Discard |
| 3 | A | * | TCP | * | 25 | 10connection/sec | ccc@ddd.com | 100mail/sec | Delay |
| 4 | * | A | TCP | 25 | * | 10connection/sec | ccc@ddd.com | 100mail/sec | Delay |
| 5 | B | * | TCP | * | 25 | . | * | 100mail/sec | Discard |
| 6 | * | B | TCP | 25 | * | . | * | 100mail/sec | Discard |
| 7 | B | * | TCP | * | 25 | . | * | 10mail/sec | Delay |
| 8 | * | B | TCP | 25 | * | . | * | 10mail/sec | Delay |
| . | . | . | . | . | . | . | . | . | . |
| . | . | . | . | . | . | . | . | . | . |
| J-1 | * | * | TCP | * | 25 | (no check) | zzz@bbb.com | (no check) | Relay |
| J | * | * | TCP | 25 | * | (no check) | zzz@aaa.com | (no check) | Relay |

FIG. 10

| Item NO. | IP SA | IP DA | Protocol | SP | DP | TCP Connection Count | Regulation Operation |
|---|---|---|---|---|---|---|---|
| 1 | A | * | TCP | * | 25 | 100connection/sec | Discard |
| 2 | * | A | TCP | 25 | * | 100connection/sec | Discard |
| 3 | A | * | TCP | * | 25 | 10connection/sec | Delay |
| 4 | * | A | TCP | 25 | * | 10connection/sec | Delay |
| . | . | . | . | . | . | | . |
| . | . | . | . | . | . | | . |
| K-1 | * | * | TCP | * | 25 | (no check) | Relay |
| K | * | * | TCP | 25 | * | (no check) | Relay |

FIG. 11

| Item NO. | IP SA | IP DA | Protocol | SP | DP | Email Address | Email Count | Regulation Operation |
|---|---|---|---|---|---|---|---|---|
| 1 | * | * | TCP | * | 25 | aaa@bbb.com | 100mail/sec | Discard |
| 2 | * | * | TCP | 25 | * | aaa@bbb.com | 100mail/sec | Discard |
| 3 | A | * | TCP | * | 25 | ccc@ddd.com | 100mail/sec | Delay |
| 4 | * | A | TCP | 25 | * | ccc@ddd.com | 100mail/sec | Delay |
| 5 | B | * | TCP | * | 25 | * | 100mail/sec | Discard |
| 6 | * | B | TCP | 25 | * | * | 100mail/sec | Discard |
| 7 | B | * | TCP | * | 25 | * | 10mail/sec | Delay |
| 8 | * | B | TCP | 25 | * | * | 10mail/sec | Delay |
| . | . | . | . | . | . | . | . | . |
| . | . | . | . | . | . | . | . | . |
| J−1 | * | * | TCP | * | 25 | zzz@bbb.com | (no check) | Relay |
| J | * | * | TCP | 25 | * | zzz@aaa.com | (no check) | Relay |

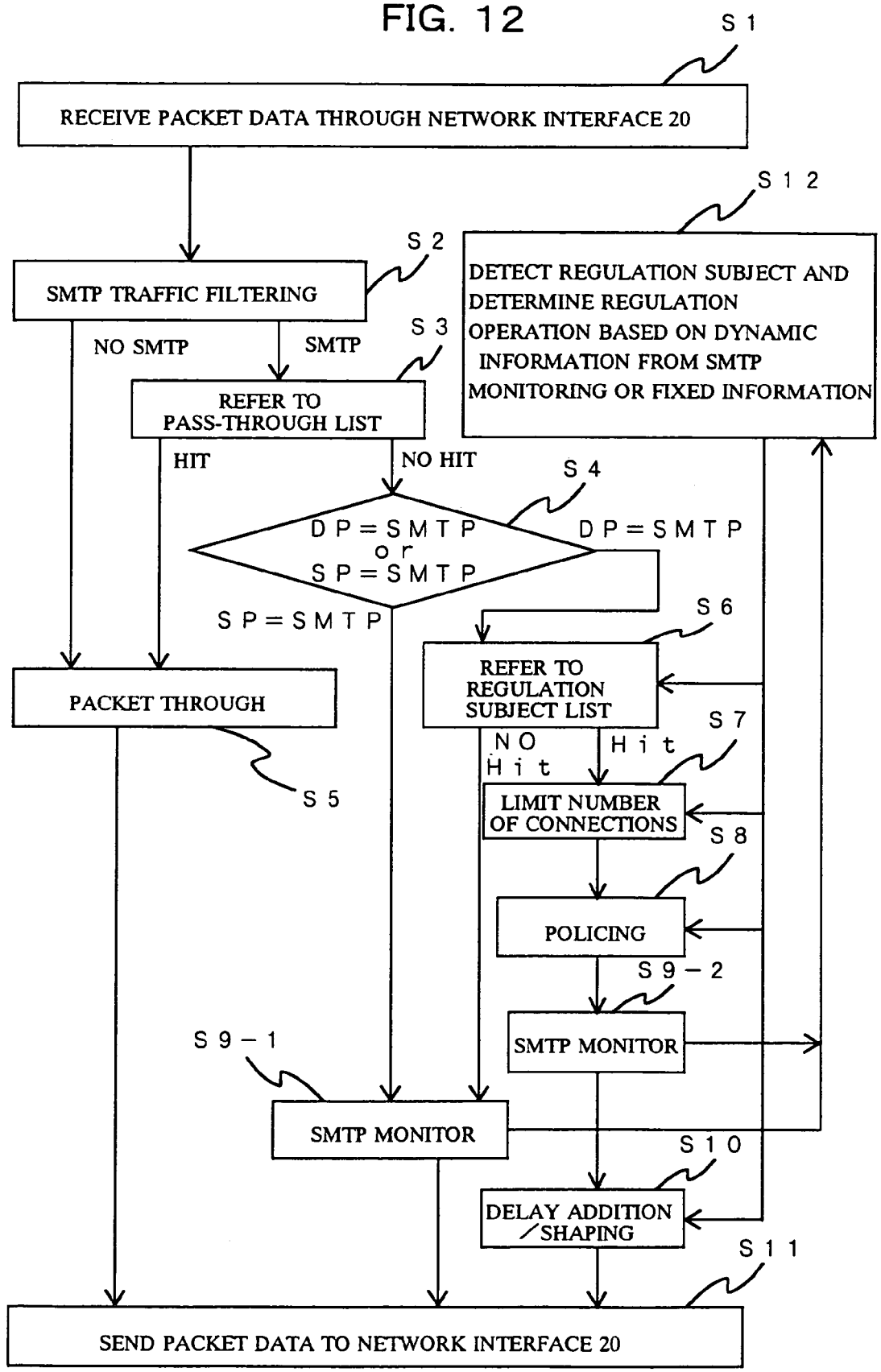

DEVICE, METHOD AND PROGRAM FOR BAND CONTROL

FIELD OF THE INVENTION

The present invention relates to a band control device placed between information processors connected via a network, and a band control method and a band control program for the same.

BACKGROUND OF THE INVENTION

With the rising number of Internet users, electronic mail or email is increasingly used as a means of communication. This leads to an increase in email traffic between computers. Besides, a rapid proliferation of mobile telephones also increases email traffic.

A useful feature of email is that it can be broadcasted. In recent years, cases have been occurring with increasing frequency in which direct mail such as an advertisement is sent to an unspecified number of users through the use of broadcast email. Such nuisance email is called spam mail.

Spam mail causes a high volume of traffic. In addition, spam mail does not always contain an address for acknowledgment of receipt, which may produce a large number of unsent email messages. The processing of an excessive number of unsent email messages constitutes a DoS (Deny of Service) attack on a receiving server. Consequently, ISPs (Internet Service Providers), telecommunications carriers, companies, etc. need to have additional mail servers to deliver spam mail and send back unsent email.

Hereinafter, the outline of a conventional mail delivery system will be given referring to FIGS. 1 and 2. In the following description of processing operation, SMTP (Simple Mail Transfer Protocol) will be cited by way of example.

FIG. 1 is a diagram showing an example of a conventional mail delivery system. Referring to FIG. 1, the mail delivery system comprises a router 101 and mail servers 2-1 to 2-3. The router 101 is placed on the boundary of a network management domain 3 managed by an ISP, a carrier, a company or the like. The mail servers 2-1 to 2-3, which will be hereinafter referred to as MTA (Message Transfer Agent), are located within the network management domain 3. The mail delivery system further comprises the Internet and MTAs 2-4 and 2-5 outside the network management domain 3. In what follows, it will be assumed that a malicious user uses the MTA 2-4 and a regular user uses MTA 2-5. In FIG. 1, the MTAs 2-4 and 2-5 send email to the MTA 2-2 within the network management domain 3.

The router 101 in general forwards traffic to the MTAs 2-1 to 2-3 in the network management domain 3 without checking whether or not received traffic is email traffic. Accordingly, when having received a high volume of SMTP traffic 102 from the MTA 2-4, the router 101 forwards the SMTP traffic 102 to the MTA 2-2.

Similarly, having received SMTP traffic 103 from the MTA 2-5, the router 101 forwards the SMTP traffic 103 to the MTA 2-2. In such a case, if the SMTP traffic 102 from the router 101 to the MTA 2-2 is so heavy that the MTA 2-2 cannot deal with it, the MTA 2-2 cannot accept the SMTP traffic 103 sent from the MTA 2-5 via the router 101.

Besides, if the router 101 receives the SMTP traffic 103 from the MTA 2-5 when being tied up with transfer operation of the SMTP traffic 102 from the MTA 2-4, the router 101 is hindered from forwarding the SMTP traffic 103 to the MTA 2-2 by the SMTP traffic 102.

FIG. 2 is a diagram showing another example of a conventional mail delivery system. In FIG. 2, the MTA 2-2 in the network management domain 3 serves as a mail delivery server. In the case where an ISP or a carrier offers server hosting services, an outside user who has subscribed to the services may deliver spam mail using the MTA 2-2 in the network management domain 3. FIG. 2 shows the condition where the MTA 2-2 sends a high volume of SMTP traffic 104 to the MTAs 2-4 and 2-5, which imposes pressure on SMTP traffic 106 from the MTA 2-1 and SMTP traffic 105 from the MTA 2-3 in the router 101.

As is described above, the mail delivery system having only the general router 101 cannot handle high volume traffic caused by spam mail.

Recently, a firewall that can identify the L4 (Layer 4) has been utilized as a device for identifying email traffic. However, the firewall does not check the contents of application level data, and is not capable of determining whether or not email received from outside is spam mail.

In, for example, Japanese Patent Applications laid open No. 2003-283572 and No. 2003-283555, there are described conventional techniques for limiting the transmission band of offensive traffic of a DDoS (Distributed Denial of Service) attack while securing communication traffic for regular users. According to the techniques, when the suspicious offensive packet of the DDoS attack is detected, a gate device reports the transmission band limit value of the suspicious offensive packet to upstream communication devices. While limiting the transmission band of the suspicious offensive packet to the received transmission band limit value, the upstream communication devices repeatedly report the transmission band limit value to further upstream communication devices up to the upper-most stream, and each communication device limits the transmission band of the suspicious offensive packet.

Additionally, in, for example, Japanese Patent Application laid open No. 2003-283554, there is described another conventional technique. According to the technique, when the suspicious offensive packet of the DDoS attack is detected, a gate device transmits the suspicious signature and the regular condition of the suspicious offensive packet to upstream communication devices. Each of the communication devices cancels the transmission band limitation of the packet identified from the regular condition and a regular signature created based upon the suspicious signature while limiting the transmission band of the packet identified from the suspicious signature. Further, the communication devices repeatedly transmits the suspicious signature and the regular condition to further upstream communication devices up to the upper-most stream, and each communication device further limits the band by detecting the offensive packet from the suspicious offensive packets while implementing the band limitation of the suspicious offensive packet.

As just described, according to the conventional techniques, when a suspicious offensive packet is detected, a gate device transmits information for limiting the transmission band of the suspicious offensive packet to upstream communication devices, and each communication device limits the transmission band of the suspicious offensive packet. That is, it will be difficult to limit the transmission band of the suspicious offensive packet with one communication device.

SUMMARY OF THE INVENTION

It is therefore an object of the present invention to provide a band control device, a band control method and a band control program for regulating specific application level traffic autonomously so that network resources can be fairly utilized.

In accordance with the first aspect of the present invention, to achieve the object mentioned above, there is provided a band control device placed between information processors connected via a network, comprising a regulation subject detector for checking the contents of application level data sent from the information processors to detect data subject to regulation, and a regulation subject controller for, when data subject to regulation (hereinafter referred to as regulation subject data) has been detected by the regulation subject detector, controlling at least one selected from L3 (Layer 3) traffic, an L4 (Layer 4) connection and an application level transaction with respect to the regulation subject data.

In accordance with the second aspect of the present invention, the band control device further comprises a state transition monitor for monitoring the state transition of application level data, and when regulation subject data has been detected based on the monitoring by the state transition monitor, the regulation subject controller controls at least one selected from L3 traffic, an L4 connection and an application level transaction with respect to the regulation subject data.

In accordance with the third aspect of the present invention, the band control device further comprises a regulation subject setting unit for setting regulation subject data.

In accordance with the fourth aspect of the present invention, the band control device further comprises a first regulation subject exclusion unit for excluding packet data not including a port number for SMTP from the subjects of regulation, a second regulation subject exclusion unit for excluding packet data including a port number for SMTP and a specific IP address as a source address or a destination address from the subjects of regulation, and/or a third regulation subject exclusion unit for excluding packet data including a specific email address from the subjects of regulation.

In accordance with the fifth aspect of the present invention, data is to be regulated when the volume of data traffic from a specific L3 address exceeds a predetermined value, when the number of L4 connections from a specific L3 address exceeds a predetermined value, when an information processor has been identified as the subject of monitoring at the application layer level and the volume of data traffic from the information processor under monitoring exceeds a predetermined value, when the number of L4 connections from a specific information processor exceeds a predetermined value and/or when the number of application level transactions from a specific information processor exceeds a predetermined value.

In accordance with the sixth aspect of the present invention, the regulation subject controller prevents traffic caused by a new application level transaction corresponding to the detected regulation subject data from passing through, refuses to establish a session for the detected regulation subject data when the termination process is being performed at the application layer level, limits the band for the L3 traffic or L4 traffic of the detected regulation subject data to a predetermined value or less, and/or adds a predetermined value of delay to the detected regulation subject data so as to increase application level processing time for the regulation subject data.

In accordance with the seventh aspect of the present invention, the control of regulation subject data includes IP level control, TCP level control and SMTP level control.

In accordance with the eighth aspect of the present invention, the IP level control of regulation subject data includes the discard of IP packet data, the addition of delay to IP packet data and the band limitation of IP packet data.

In accordance with the ninth aspect of the present invention, the TCP level control of regulation subject data includes the termination of a TCP connection, the limitation of the number of TCP connections and the addition of delay to TCP ACK (acknowledgment).

In accordance with the tenth aspect of the present invention, the SMTP level control of regulation subject data includes the forced termination of an SMTP transaction, the limitation of the number of SMTP transactions and the addition of delay to an SMTP command response.

In accordance with the eleventh aspect of the present invention, there is provided a band control method applied to a band control device placed between information processors connected via a network, comprising the steps of checking the contents of application level data sent from the information processors to detect regulation subject data (regulation subject detecting step), and, when regulation subject data has been detected, controlling at least one selected from L3 traffic, an L4 connection and an application level transaction with respect to the regulation subject data (regulation subject controlling step).

In accordance with the twelfth aspect of the present invention, the band control method further comprises the step of monitoring the state transition of application level data (state transition monitoring step), and when regulation subject data has been detected based on the monitoring, the band control device controls at least one selected from L3 traffic, an L4 connection and an application level transaction with respect to the regulation subject data.

In accordance with the thirteenth aspect of the present invention, the band control method further comprises the step of setting regulation subject data (regulation subject setting step), and the band control device checks the contents of application level data sent from the information processors to detect regulation subject data based on the setting.

In accordance with the fourteenth aspect of the present invention, the band control method further comprises the steps of excluding packet data not including a port number for SMTP from the subjects of regulation, excluding packet data including a port number for SMTP and a specific IP address as a source address or a destination address from the subjects of regulation, and/or excluding packet data including a specific email address from the subjects of regulation (regulation subject excluding steps).

In accordance with the fifteenth aspect of the present invention, data is to be regulated in the regulation subject controlling step when the volume of data traffic from a specific L3 address exceeds a predetermined value, when the number of L4 connections from a specific L3 address exceeds a predetermined value, when an information processor has been identified as the subject of monitoring at the application layer level and the volume of data traffic from the information processor under monitoring exceeds a predetermined value, when the number of L4 connections from a specific information processor exceeds a predetermined value and/or when the number of application level transactions from a specific information processor exceeds a predetermined value.

In accordance with the sixteenth aspect of the present invention, in the regulation subject controlling step, the band control device prevents traffic caused by a new application level transaction corresponding to the detected regulation subject data from passing through, refuses to establish a session for the detected regulation subject data when the termination process is being performed at the application layer level, limits the band for the L3 traffic or L4 traffic of the detected regulation subject data to a predetermined value or less, and/or adds a predetermined value of delay to the detected regulation subject data so as to increase application level processing time for the regulation subject data.

In accordance with the seventeenth aspect of the present invention, in the regulation subject controlling step, the control of the regulation subject data includes IP level control, TCP level control and SMTP level control.

In accordance with the eighteenth aspect of the present invention, in the regulation subject controlling step, the IP level control of the regulation subject data includes the discard of IP packet data, the addition of delay to IP packet data and the band limitation of IP packet data.

In accordance with the nineteenth aspect of the present invention, in the regulation subject controlling step, the TCP level control of the regulation subject data includes the termination of a TCP connection, the limitation of the number of TCP connections and the addition of delay to TCP ACK.

In accordance with the twentieth aspect of the present invention, in the regulation subject controlling step, the SMTP level control of the regulation subject data includes the forced termination of an SMTP transaction, the limitation of the number of SMTP transactions and the addition of delay to an SMTP command response.

In accordance with the twenty-first aspect of the present invention, there is provided a band control program executed in a band control device placed between information processors connected via a network, making the band control device perform the processes of checking the contents of application level data sent from the information processors to detect regulation subject data (regulation subject detecting process), and, when regulation subject data has been detected, controlling at least one selected from L3 traffic, an L4 connection and an application level transaction with respect to the regulation subject data (regulation subject controlling process).

In accordance with the twenty-second aspect of the present invention, the band control program makes the band control device further perform the process of monitoring the state transition of application level data (state transition monitoring process), and when regulation subject data has been detected based on the monitoring, the band control device controls at least one selected from L3 traffic, an L4 connection and an application level transaction with respect to the regulation subject data.

In accordance with the twenty-third aspect of the present invention, the band control program makes the band control device further perform the process of setting regulation subject data (regulation subject setting process), and the band control device checks the contents of application level data sent from the information processors to detect regulation subject data based on the setting.

In accordance with the twenty-fourth aspect of the present invention, the band control program makes the band control device further perform the process of excluding packet data not including a port number for SMTP from the subjects of regulation, excluding packet data including a port number for SMTP and a specific IP address as a source address or a destination address from the subjects of regulation, and/or excluding packet data including a specific email address from the subjects of regulation (regulation subject excluding processes).

In accordance with the twenty-fifth aspect of the present invention, data is to be regulated in the regulation subject controlling process when the volume of data traffic from a specific L3 address exceeds a predetermined value, when the number of L4 connections from a specific L3 address exceeds a predetermined value, when an information processor has been identified as the subject of monitoring at the application layer level and the volume of data traffic from the information processor under monitoring exceeds a predetermined value, when the number of L4 connections from a specific information processor exceeds a predetermined value and/or when the number of application level transactions from a specific information processor exceeds a predetermined value.

In accordance with the twenty-sixth aspect of the present invention, in the regulation subject controlling process, the band control device prevents traffic caused by a new application level transaction corresponding to the detected regulation subject data from passing through, refuses to establish a session for the detected regulation subject data when the termination process is being performed at the application layer level, limits the band for the L3 traffic or L4 traffic of the detected regulation subject data to a predetermined value or less, and/or adds a predetermined value of delay to the detected regulation subject data so as to increase application level processing time for the regulation subject data.

In accordance with the twenty-seventh aspect of the present invention, in the regulation subject controlling process, the control of the regulation subject data includes IP level control, TCP level control and SMTP level control.

In accordance with the twenty-eighth aspect of the present invention, in the regulation subject controlling process, the IP level control of the regulation subject data includes the discard of IP packet data, the addition of delay to IP packet data and the band limitation of IP packet data.

In accordance with the twenty-ninth aspect of the present invention, in the regulation subject controlling process, the TCP level control of the regulation subject data includes the termination of a TCP connection, the limitation of the number of TCP connections and the addition of delay to TCP ACK.

In accordance with the thirtieth aspect of the present invention, in the regulation subject controlling process, the SMTP level control of the regulation subject data includes the forced termination of an SMTP transaction, the limitation of the number of SMTP transactions and the addition of delay to an SMTP command response.

BRIEF DESCRIPTION OF THE DRAWINGS

The objects and features of the present invention will become more apparent from the consideration of the following detailed description taken in conjunction with the accompanying drawings in which:

FIG. 6 is a diagram showing an example of the construction of an L3/L4 pass-through list database 35 depicted in FIG. 5;

FIG. 7 is a diagram showing an example of the construction of an L3/L4 regulation subject list database 36 depicted in FIG. 5;

FIG. 8 is a diagram showing an example of the construction of an application pass-through list database 55 depicted in FIG. 5;

FIG. 9 is a diagram showing an example of the construction of an application regulation subject list database 56 and regulation subject list database 66 depicted in FIG. 5 storing three types of information: the upper limit number of TCP connections for decision on the activation of regulation operation, the address of email to be regulated, and the upper limit number of email messages for decision on the activation of regulation operation;

FIG. 10 is a diagram showing another example of the construction of an application regulation subject list database 56 and regulation subject list database 66 depicted in FIG. 5 storing information on the upper limit number of TCP connections for decision on the activation of regulation operation; and FIG. 11 is a diagram showing yet another example of the construction of an application regulation subject list database 56 and regulation subject list database 66 depicted in FIG. 5 storing information on the address of email to be regulated and the upper limit number of email messages for decision on the activation of regulation operation; and FIG. 12 is a flowchart showing the operation of the application band control device according to the embodiment of the present invention.

DESCRIPTION OF THE PREFERRED EMBODIMENTS

Figure 1:
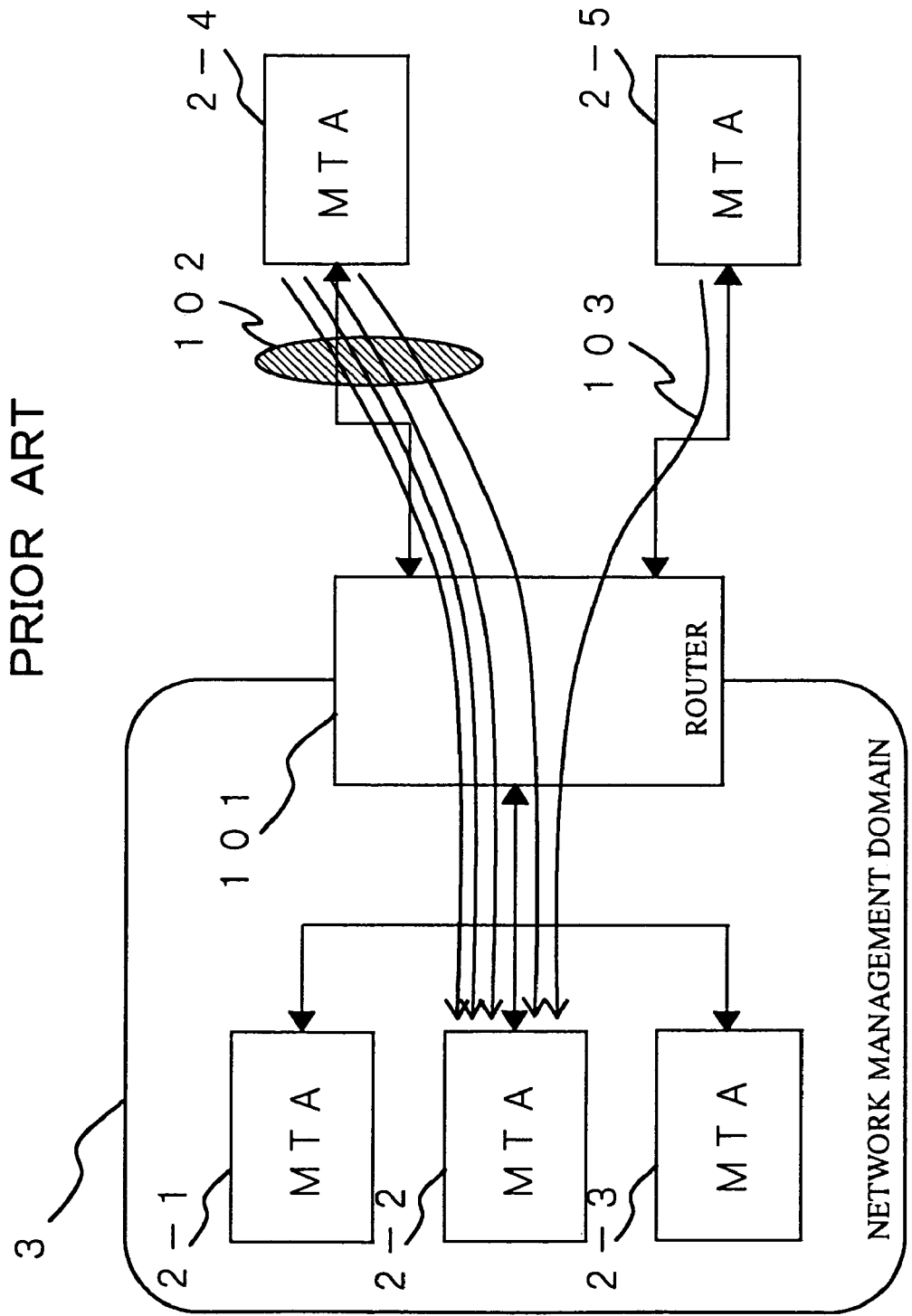
FIG. 1 is a diagram showing an example of a conventional mail delivery system.

First, a band control device according to a preferred embodiment of the present invention will be described.

The band control device is a network device placed between information processors connected via a network. The band control device checks or scans the contents of application layer data sent from the information processors to detect data subject to regulation. When regulation subject data has been detected, the band control device performs processes such as shutdown, band limitation and delay addition for L3 traffic, an L4 connection and an application level transaction with respect to the regulation subject data. More specifically, when regulation subject data has been detected, the band control device prevents a new application level (L7) session or transaction traffic from passing through. Besides, when the termination process is performed at the application layer level, the band control device refuses to establish a session. In addition, the band control device limits the volume (band) of L3 traffic or L4 traffic to a predetermined value or less, and/or adds a predetermined value of delay to the regulation subject data so as to increase application level processing time for the regulation subject data.

For example, data is to be regulated in cases as follows:
1. if the volume of data traffic from a specific L3 address exceeds a predetermined value;
2. if the number of L4 connections from a specific L3 address exceeds a predetermined value;
3. if an information processor has been identified as the subject of monitoring at the application layer level, and the volume of data traffic from the information processor under monitoring exceeds a predetermined value;
4. if the number of L4 connections from a specific information processor exceeds a predetermined value; and/or
5. if the number of application level transactions from a specific information processor exceeds a predetermined value.

Incidentally, whether or not the volume of data traffic exceeds a predetermined value may be determined based on the volume of data traffic per unit of time or the gross volume of data traffic. Similarly, whether or not the number of L4 connections exceeds a predetermined value may be determined based on the number of L4 connections per unit of time or the total number of L4 connections, and whether or not the number of application level transactions exceeds a predetermined value may be determined based on the number of application level transactions per unit of time or the total number of application level transactions.

The band control device may monitor the state transition of application level data to detect regulation subject data. In this case, having detected regulation subject data based on the monitoring, the band control device performs processes such as shutdown, band limitation and delay addition for L3 traffic, an L4 connection and an application level transaction with respect to the regulation subject data.

In order to detect regulation subject data in an email delivery system using SMTP (Simple Mail Transfer Protocol), the band control device counts or measures the number of IP packets of email, the number of TCP connections, the number of transmitted email messages, the duration of an SMTP transaction, the number of destination email addresses (RCPT-To) of SMTP messages with the same source email address (Mail From), the number of SMTP error responses, the number of concurrently established TCP connections, and the number of concurrently established SMTP transactions, with respect to each IP address of a sending SMTP server and that of a receiving SMTP server, TCP connection for mail delivery, and SMTP transaction for mail delivery. The band control device determines that the data is subject to regulation when any of the measured values exceeds a predetermined value or according to a combination of measured values that exceed their respective predetermined values. Thereby, the band control device performs regulation operation for the IP packets, TCP connection and SMTP transaction corresponding to the regulation subject data. Incidentally, the contents of data to be regulated may be set in advance.

The band control device operates in the same manner as described above when detecting regulation subject data by monitoring the state transition of application level data.

The band control device performs IP level control or regulation operation, TCP level regulation operation and SMTP level regulation operation. The IP-level regulation operation includes the discard of IP packet data, the addition of delay to IP packet data and the band limitation of IP packet data (policing and shaping). The TCP-level regulation operation includes the termination of a TCP connection, the limitation of the number of TCP connections (denial of a new TCP connection) and the addition of delay to TCP ACK. The SMTP-level regulation operation includes the forced termination of an SMTP transaction, the limitation of the number of SMTP transactions (denial of a new SMTP transaction) and the addition of delay to an SMTP command response.

In addition, the band control device may unconditionally exclude packet data including a specific IP address as a source address or a destination address and a port number for SMTP and/or an SMTP transaction including a specific email address from the subjects of regulation.

Referring now to the drawings, a description will be given of an application band control device according to the first embodiment of the present invention.

The application band control device of the first embodiment checks or scans the contents of data received from a communication apparatus to detect data subject to regulation at the application layer level. When data subject to regulation or regulation subject data has been detected, the application band control device controls L3 traffic, an L4 connection and/or an application level transaction with respect to the regulation subject data, thus enabling network resources to be fairly utilized.

More specifically, the application band control device performs processes such as shutdown, band limitation and delay addition for the L3 traffic, L4 connection and application level transaction with respect to the regulation subject data to autonomously regulate email traffic from an MTA that can be malicious. Thereby, the application band control device suppresses the increase in traffic caused by spam mail.

Figure 3:
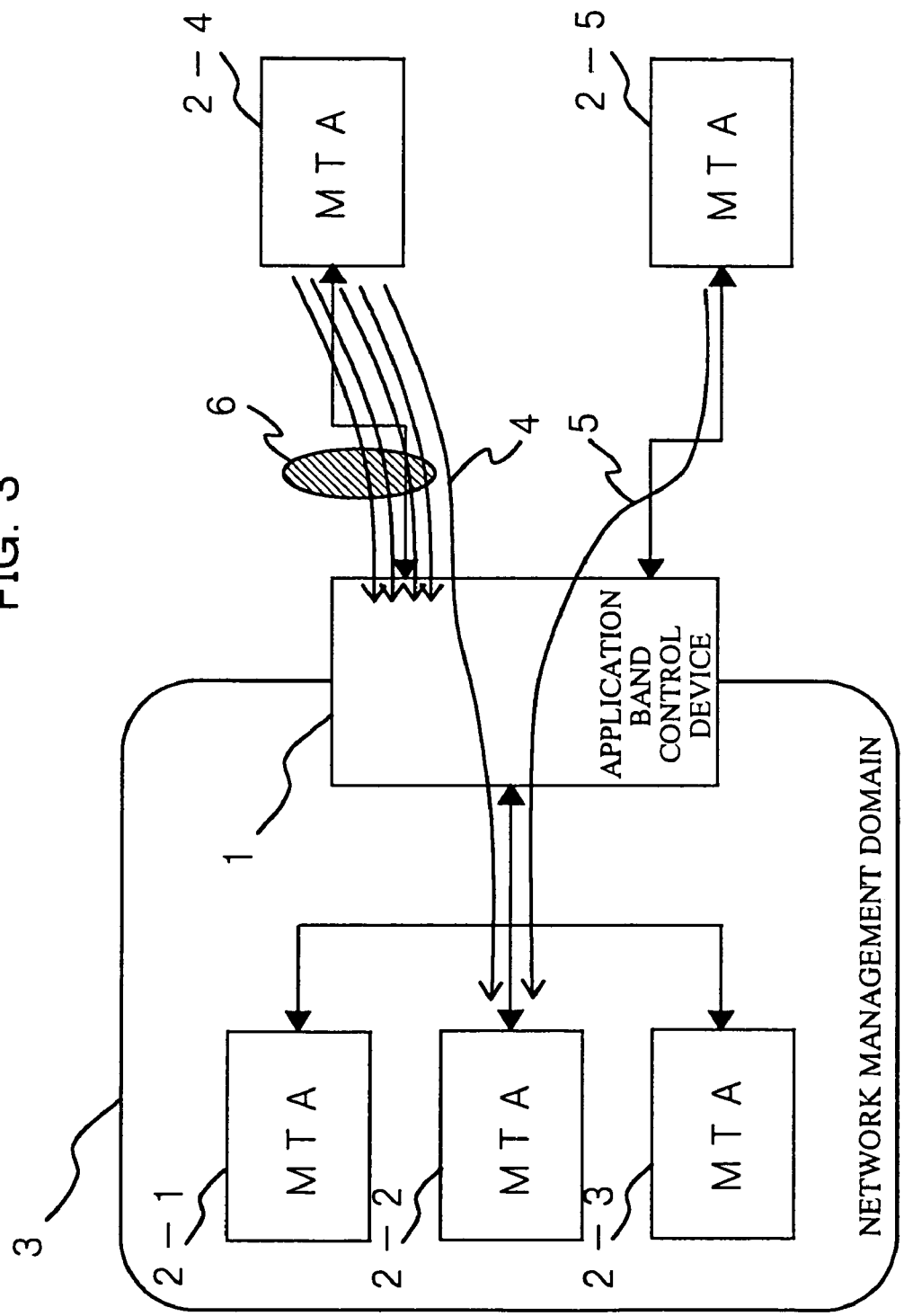
FIG. 3 is a diagram showing an example of a mail delivery system using an application band control device according to an embodiment of the present invention.

FIG. 3 is a schematic diagram showing an example of a mail delivery system provided with the application band control device of this embodiment. Incidentally, the construction of the mail delivery system shown in FIG. 3 corresponds to that of the conventional mail delivery system described previously in connection with FIG. 1.

Referring to FIG. 3, in the mail delivery system, the application band control device 1 regulates email traffic 6 sent from the MTA 2-4 used by a malicious user, and forwards only part of traffic (traffic 4) from the MTA 2-4 to the MTA 2-2. The application band control device 1 forwards email traffic 5 from the MTA 2-5 to the MTA 2-2 in an orderly manner.

Figure 2:
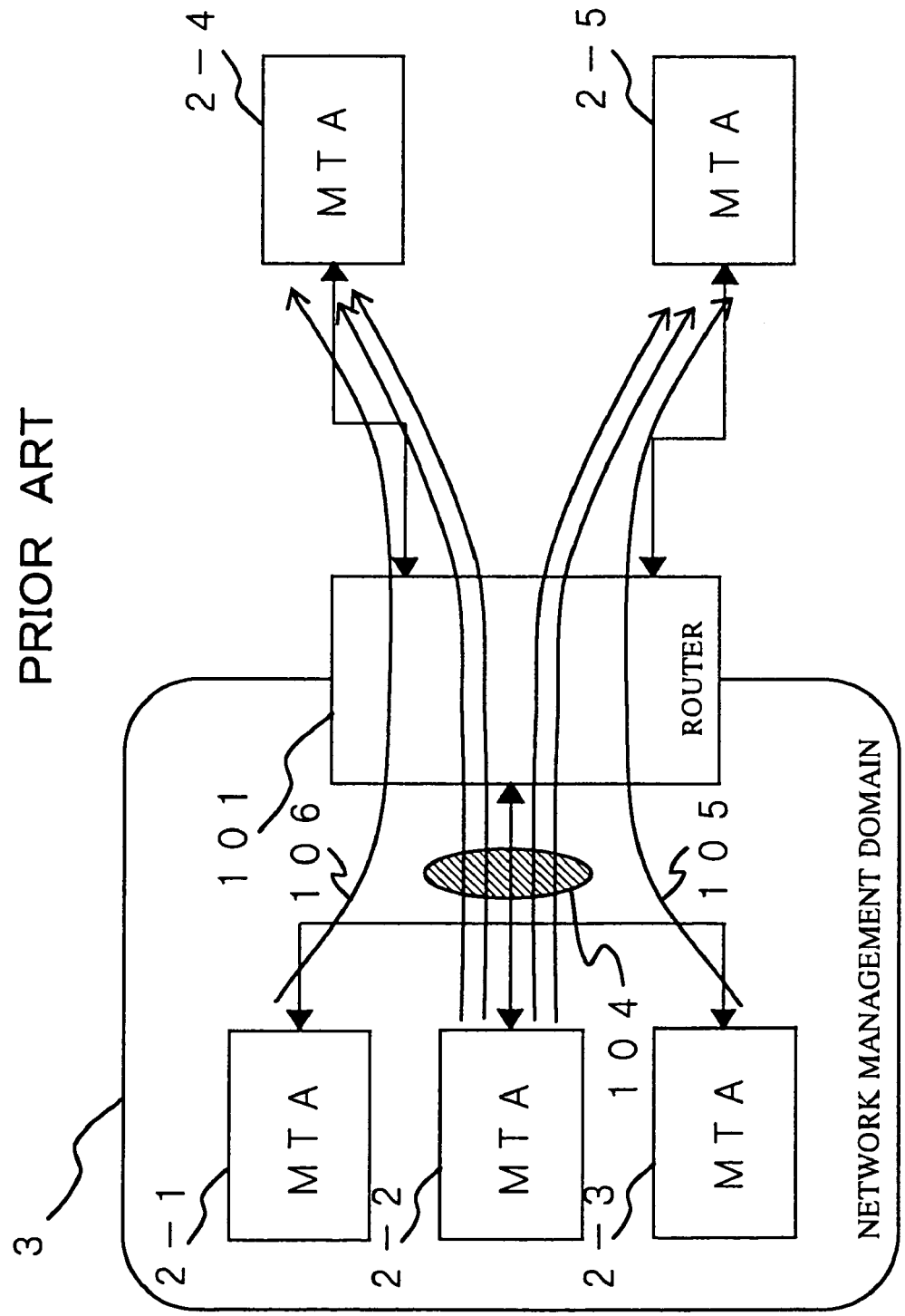
FIG. 2 is a diagram showing another example of a conventional mail delivery system.
Figure 4:
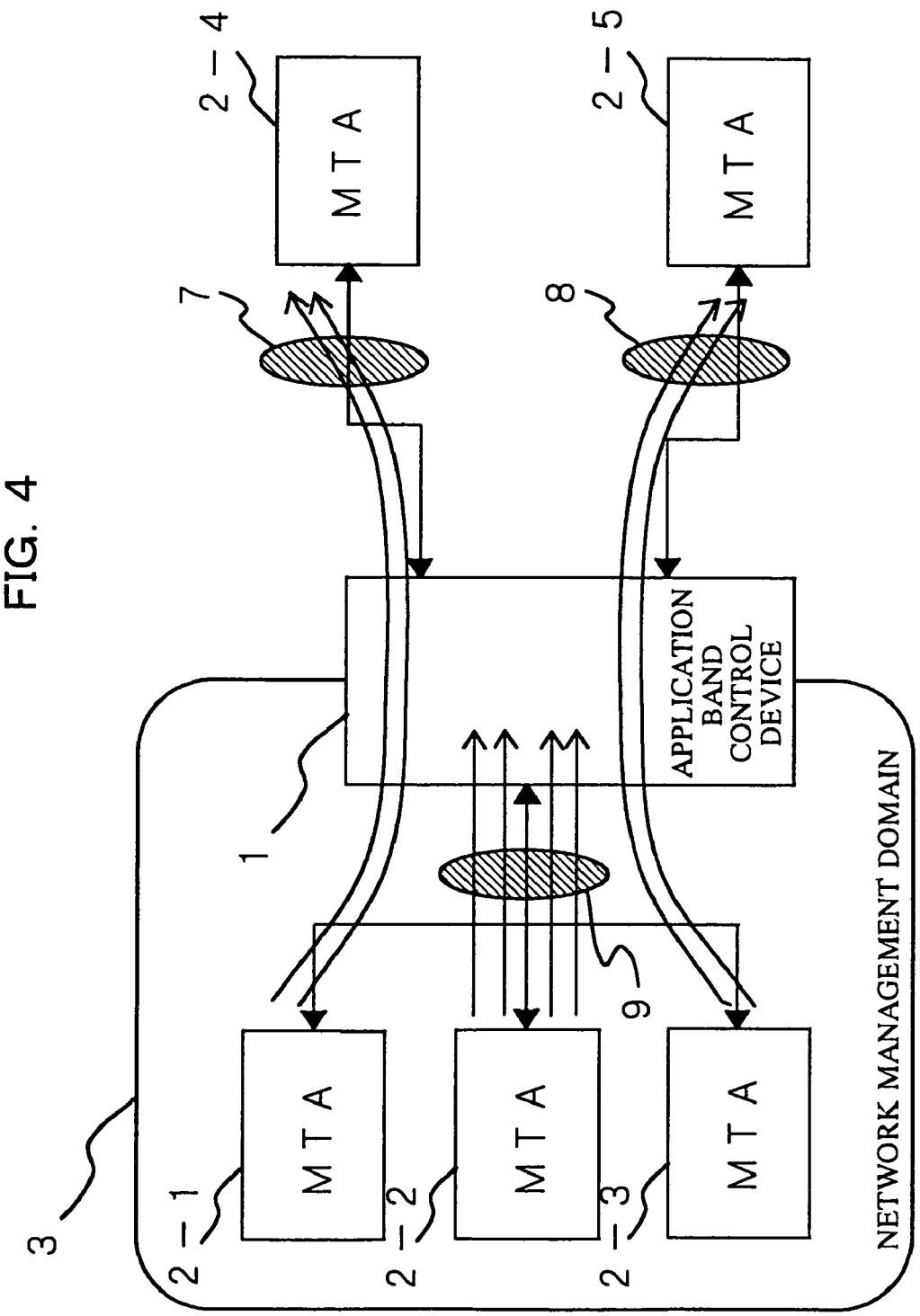
FIG. 4 is a diagram showing another example of the mail delivery system using the application band control device according to the embodiment of the present invention.

FIG. 4 is a schematic diagram showing another example of a mail delivery system provided with the application band control device of this embodiment. Incidentally, the construction of the mail delivery system shown in FIG. 4 corresponds to that of the conventional mail delivery system described previously in connection with FIG. 2.

Referring to FIG. 4, in the mail delivery system, the application band control device 1 regulates spam mail sent from the MTA 2-2 used by a malicious user, and dose not forward email traffic 9 caused by the spam mail to the MTAs 2-4 and 2-5 outside the network management domain 3. The application band control device 1 forwards email traffic 5 from the other MTAs 2-1 and 2-3 within the network management domain 3 to the outside MTAs 2-4 and 2-5 in an orderly manner.

[Construction of Application Band Control Device 1]

Figure 5:
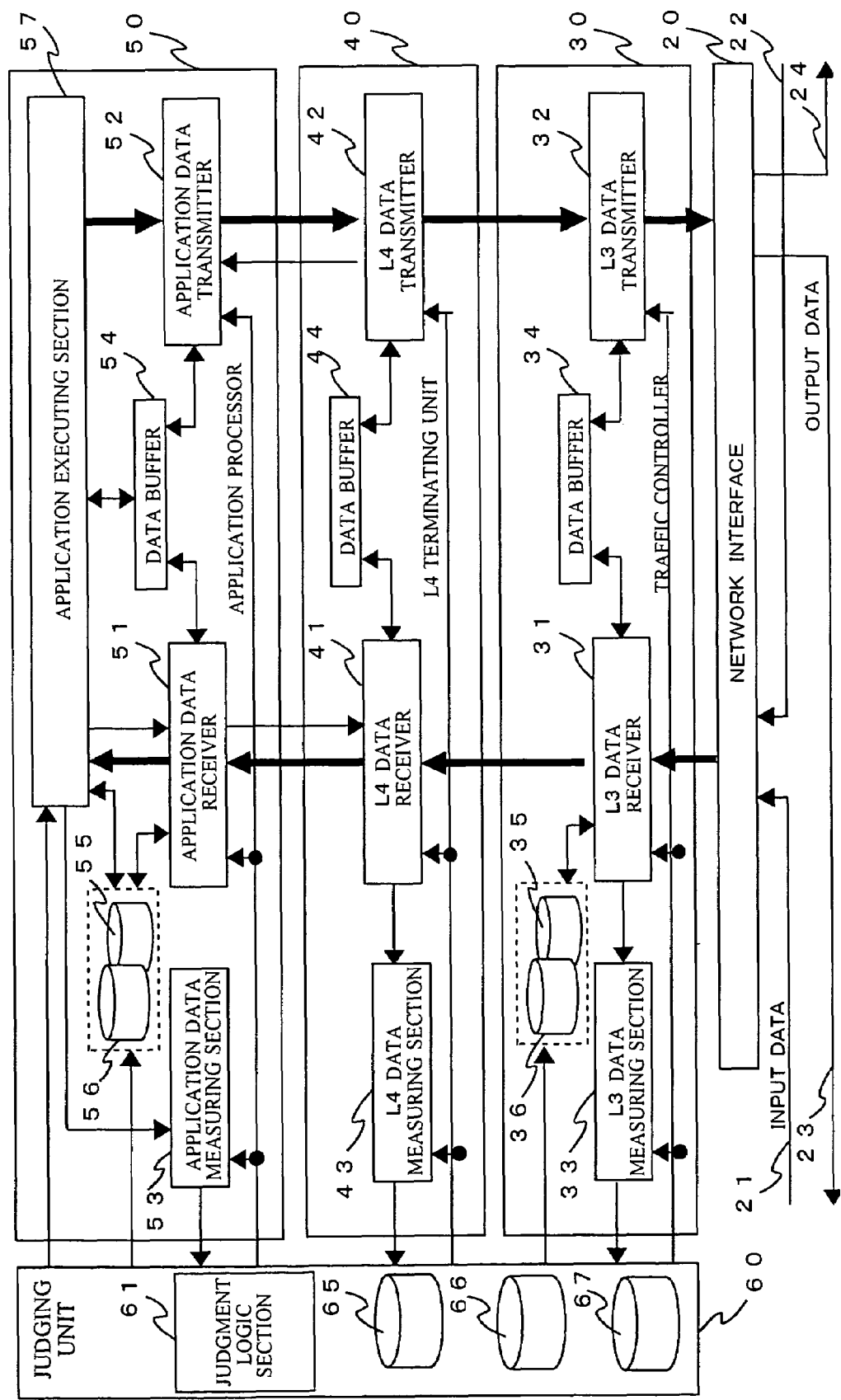
FIG. 5 is a block diagram showing the construction of the application band control device according to the embodiment of the present invention.

In the following, a description will be given of the construction of the application band control device 1 of this embodiment referring to FIG. 5. FIG. 5 is a block diagram showing the construction of the application band control device 1 for email. In this embodiment, for example, IP, TCP and SMTP are used as the L3 protocol, L4 protocol and application layer protocol, respectively.

As can be seen in FIG. 5, the application band control device 1 comprises a network interface 20, a traffic controller 30, an L4 terminating unit 40, an application processor 50 and a judging unit 60.

[Construction of Network Interface 20]

The network interface 20 is provided with one or more input/output ports. In the example of FIG. 5, the network interface 20 is provided with two input/output ports. An input port 21 and an output port 23 are connected with communication apparatuses within the network management domain 3. An input port 22 and an output port 24 are connected with communication apparatuses outside the network management domain 3.

[Function of Network Interface 20]

The network interface 20 terminates a physical layer (layer 1) and a data link layer (layer 2). While there is no special limitation upon the types of the physical layer and data link layer, the following description will be made of the case where Ethernet® is used as the data link layer. Additionally, MAC frame data are transferred between the network interface 20 and the traffic controller 30.

The network interface 20 receives MAC frame data from networks via the input ports 21 and 22 inside and outside the network management domain 3, and sends the MAC frame data to an L3 data receiver 31 of the traffic controller 30. The network interface 20 also receives MAC frame data from an L3 transmitter 32 of the traffic controller 30, and sends the MAC frame data to the output ports 23 and 24 inside and outside the network management domain 3.

[Construction of Network Interface 30]

The traffic controller 30 is connected with the network interface 20, the L4 terminating unit 40 and the judging unit 60.

The traffic controller 30 comprises the L3 data receiver 31, the L3 data transmitter 32, an L3 data measuring section 33, a data buffer 34, and an L3/L4 pass-through list database 35 and an L3/L4 regulation subject list database 36.

[Function of L3 Data Receiver 31]

The L3 data receiver 31 receives MAC frame data sent from the network interface 20. The L3 data receiver 31 extracts IP header information and an IP address from the MAC frame data, and identifies the upper protocol (TCP/UDP, etc.) of the MAC frame data. Having identified the upper protocol, the L3 data receiver 31 extracts header information of the upper protocol (TCP header information) from the MAC frame data. The L3 data receiver 31 once stores the MAC frame data received from the network interface 20 in the data buffer 34.

FIG. 6 is a diagram showing an example of the construction of the L3/L4 pass-through list database 35. FIG. 7 is a diagram showing an example of the construction of the L3/L4 regulation subject list database 36.

Based on the IP header information and the TCP header information extracted from the MAC frame data, the L3 data receiver 31 refers to IP addresses and TCP connection information of data excluded from the subjects of regulation stored in the L3/L4 pass-through list database 35 (see FIG. 6) and IP addresses and TCP connection information of regulation subject data stored in the L3/L4 regulation subject list database 36 (see FIG. 7) to determine whether to transfer the MAC frame data once stored in the data buffer 34 to the L3 data transmitter 32 or an L4 data receiver 41, or discard the data within the traffic controller 30. Incidentally, the IP address herein described is information indicating a pair of an IP source address (IP SA in FIGS. 6 and 7) and an IP destination address (IP DA in FIGS. 6 and 7) obtained from the MAC frame data. The TCP connection information is information indicating a combination of an IP source address (IP SA in FIGS. 6 and 7), an IP destination address (IP DA in FIGS. 6 and 7), protocol (Protocol in FIGS. 6 and 7), source port number (SP in FIGS. 6 and 7) and destination port number (DP in FIGS. 6 and 7).

When the IP address or TCP connection information of the MAC frame data once stored in the data buffer 34 matches those of data excluded from the subjects of regulation stored in the L3/L4 pass-through list database 35, the L3 data receiver 31 forwards the MAC frame data to the L3 data transmitter 32. This process will hereinafter be referred to as packet through processing.

When the IP address and TCP connection information of the MAC frame data once stored in the data buffer 34 match neither those of data excluded from the subjects of regulation stored in the L3/L4 pass-through list database 35 nor those of regulation subject data stored in the L3/L4 regulation subject list database 36, the L3 data receiver 31 forwards the MAC frame data to the L4 data receiver 41. This process will hereinafter be referred to as application relay processing.

When the IP address and TCP connection information of the MAC frame data once stored in the data buffer 34 does not match those of data excluded from the subjects of regulation stored in the L3/L4 pass-through list database 35, but either of them match those of regulation subject data stored in the L3/L4 regulation subject list database 36, the L3 data receiver 31 determines whether to transfer the MAC frame data to the L4 data receiver 41 (application relay processing) or discard the data within the traffic controller 30 (hereinafter referred to as MAC frame data discard processing) referring to the regulation operation field (Regulation Operation in FIG. 7) in the L3/L4 regulation subject list database 36.

For example, when "relay" is designated according to the regulation operation in the L3/L4 regulation subject list database 36, the L3 data receiver 31 forwards the MAC frame data to the L4 data receiver 41 (application relay processing). On the other hand, when "discard" is designated according to the regulation operation in the L3/L4 regulation subject list database 36, the L3 data receiver 31 discards the MAC frame data within the traffic controller 30 (MAC frame data discard processing).

Besides, the L3 data receiver 31 sends the IP header information and the TCP header information extracted thereat to the L3 data measuring section 33. When forwarding the MAC frame data once stored in the data buffer 34 to the L4 data receiver 41, the L3 data receiver 31 also sends the IP header information and the TCP header information extracted from the MAC frame data to the L4 data receiver 41.

Upon instruction from the judging unit 60, the L3 data receiver 31 performs packet through processing, application relay processing or MAC frame data discard processing with respect to MAC frame data based on IP addresses or TCP connection information enrolled in the L3/L4 pass-through list database 35 and the L3/L4 regulation subject list database 36.

[Function of L3 Data Transmitter 32]

The L3 data transmitter 32 receives MAC frame data from the L3 data receiver 31 via the data buffer 34, and sends the MAC frame data to the network interface 20. Besides, the L3 data transmitter 32 receives TCP data sent from an L4 data transmitter of the L4 terminating unit 40, and adds IP header information corresponding to the TCP data to the TCP data, thereby producing IP packet data. The L3 data transmitter 32 adds MAC header information to the IP packet data to produce MAC frame data, and sends the MAC frame data to the network interface 20. When the IP packet data produced by the L3 data transmitter 32 is IP packet data subject to regulation, the L3 data transmitter 32 once stores the IP packet data in the data buffer 34. After performing regulation operation, the L3 data transmitter 32 retrieves the IP packet data once stored in the data buffer 34, and adds MAC header information to the IP packet data to produce MAC frame data. The L3 data transmitter 32 sends the MAC frame data to the network interface 20.

Upon instruction from the judging unit 60, the L3 data transmitter 32 performs transmission regulation operation (delay addition processing) when the IP packet data whose IP address or TCP connection information matches that enrolled in the L3/L4 regulation subject list database 36, and "delay" is designated according to the regulation operation in the database 36.

[Function of L3 Data Measuring Section 33]

The L3 data measuring section 33 receives IP header information and TCP header information sent from the L3 data receiver 31. Based on the received IP header information and TCP header information, the L3 data measuring section 33 counts the number of TCP connections to the same destination port number (SMTP in this embodiment) with the same source IP address and the number of TCP connections to the same destination IP address with the same source port number (SMTP in this embodiment).

Having determined that the number of TCP connections to the same destination port number with the same source IP address or the number of TCP connections to the same destination IP address with the same source port number, which has been obtained based on the IP header information and the TCP header information received from the L3 data receiver 31, is equal to or larger than a predetermined value, the L3 data measuring section 33 sends the IP header information and the TCP header information to the judging unit 60.

[Function of L3 Data Buffer 34]

The data buffer 34 temporarily stores MAC frame data to be transmitted from the L3 data receiver 31 and IP packet data to be transmitted from the L3 data transmitter 32.

Functions of L3/L4 Pass-Through List Database 35 and L3/L4 Regulation Subject List Database 36

The L3/L4 pass-through list database 35 stores IP addresses and TCP connection information of data excluded from the subjects of regulation. For the data whose IP address or TCP connection information are contained in the L3/L4 pass-through list, only packet through processing is performed. Therefore, the L3/L4 pass-through list database 35 does not includes the regulation operation field. The L3/L4 regulation subject list database 36 stores IP addresses and TCP connection information of regulation subject data and regulation operation with respect to each data.

The judging unit 60 sets the information stored in the L3/L4 pass-through list database 35 and the L3/L4 regulation subject list database 36. The L3 data receiver 31 refers to information stored in the respective L3/L4 pass-through list database 35 and the L3/L4 regulation subject list database 36 to collate the information with IP header information and TCP header information extracted thereat.

The L3/L4 pass-through list database 35 shown in FIG. 6 includes five fields: IP source address (IP SA), IP destination address (IP DA), protocol (Protocol), source port number (SP) and destination port number (DP).

The L3/L4 regulation subject list database 36 shown in FIG. 7 has essentially the same construction as described above for the L3/L4 pass-through list database 35 except for the presence of the regulation operation field. Examples of regulation operations include application relay processing (relay), delay addition processing (delay) and MAC frame data discard processing (discard).

[Construction of L4 Terminating Unit 40]

The L4 terminating unit 40 is connected with the traffic controller 30, the application processor 50 and the judging unit 60.

The L4 terminating unit 40 comprises the L4 data receiver 41, an L4 data transmitter 42, an L4 data measuring section 43, and a data buffer 44.

[Function of L4 Data Receiver 41]

The L4 data receiver 41 receives MAC frame data with IP header information and TCP header information sent from the L3 data receiver 31 of the traffic controller 30. Having received MAC frame data sent from the L3 data receiver 31, the L4 data receiver 41 performs TCP termination processes. Examples of the TCP termination processes include TCP connection state transition management, TCP connection open (three-way handshake), TCP connection close (four-way handshake), the retrieval of TCP data from the MAC frame data, received packet order management, and the reassembling of packets into an SMTP message.

On receipt of MAC frame data, the L4 data receiver 41 extracts the upper protocol data (an SMTP message in this embodiment) from the MAC frame data, and sends the extracted SMTP message to an application data receiver 51 of the application processor 50 for SMTP relay processing. When having received a backpressure signal from the application data receiver 51, the L4 data receiver 41 stops sending SMTP messages to the application data receiver 51, and temporarily stores the SMTP messages in the data buffer 44. At the instant that the backpressure signal ceases to be received, the L4 data receiver 41 reads out the SMTP messages once stored in the data buffer 44 to send them to the application data receiver 51.

Besides, the L4 data receiver 41 manages the state transition of each TCP connection as the TCP termination process. The L4 data receiver 41 sends the L4 data measuring section 43 TCP connection information and TCP connection open and close information for relevant TCP data. The L4 data receiver 41 performs reception regulation operation for TCP data corresponding to MAC frame data designated by the judging unit 60. Examples of reception regulation operations for TCP data include denial of a new connection: the discard of data on receipt of SYN (synchronization) packet data, and the termination of an existing connection: the discard of subsequent received data.

[Function of L4 Data Transmitter 42]

The L4 data transmitter 42 receives an SMTP message sent from an application data transmitter 52 of the application processor 50 for SMTP relay processing. The L4 data transmitter 42 packetizes the received SMTP message to obtain TCP data, and forward the TCP data to the L3 data transmitter 32. On this occasion, the L4 data transmitter 42 refers to information on TCP connection state transition managed by the L4 data receiver 41 to control the transmission or transfer of the TCP data.

In order to terminate the reception of SMTP messages sent from the application data transmitter 52, the L4 data transmitter 42 sends a backpressure signal to the application data transmitter 52. Besides, the L4 data transmitter 42 performs transmission regulation operation for specific TCP data designated by the judging unit 60. Examples of transmission regulation operations for TCP data include denial of a new connection: the transmission of RST (reset) packet data on receipt of SYN packet data, the termination of an existing connection: the transmission of FIN (finish) packet data, and the delaying of TCP ACK transmission.

[Function of L4 Data Measuring Section 43]

The L4 data measuring section 43 measures the duration of TCP connection based on TCP connection information and TCP connection open and close information sent from the L4 data receiver 41.

The L4 data measuring section 43 also informs the judging unit 60 of TCP connection open and close based on the TCP connection information and TCP connection open and close information sent from the L4 data receiver 41.

In addition, when the duration of the TCP connection managed by the L4 data measuring section 43 has become equal to or more than a threshold, the L4 data measuring section 43 sends the TCP connection information to the judging unit 60. The threshold of the duration of TCP connection is preset at the L4 data measuring section 43. Incidentally, the threshold of the duration of TCP connection may be changed.

[Function of Data Buffer 44]

The data buffer 44 temporarily stores SMTP messages to be transmitted from the L4 data receiver 41 and TCP data to be transmitted from the L4 data transmitter 42.

[Construction of Application Processor 50]

The application processor 50 is connected with the L4 terminating unit 40 and the judging unit 60.

The application processor 50 comprises the application data receiver 51, the application data transmitter 52, an application data measuring section 53, a data buffer 54, an application pass-through list database 55, an application regulation subject list database 56, and an application executing section 57.

[Function of Application Data Receiver 51]

The application data receiver 51 receives SMTP messages sent from the L4 data receiver 41, and sends the received messages one by one to the application executing section 57. When the amount of SMTP messages exceeds the data transfer capacity of the application executing section 57, the application executing section 57 sends a backpressure signal to the application data receiver 51 so that the SMTP messages are to be temporarily stored in the data buffer 54.

When having received the backpressure signal from the application executing section 57, the application data receiver 51 temporarily stores the SMTP messages in the data buffer 54. After that, the application data receiver 51 provides the application executing section 57 with SMTP message identification information for identifying the SMTP messages stored in the data buffer 54. When the application executing section 57 becomes available to transmit the SMTP messages, the application executing section 57 stops sending the backpressure signal to the application data receiver 51 and reads out the SMTP messages once stored in the data buffer 54 based on the SMTP message identification information received from the application data receiver 51. Thereby, the application executing section 57 obtains the SMTP messages temporarily stored in the data buffer 54.

Incidentally, at the instant that the backpressure signal ceases to be received, the application data receiver 51 may read out the SMTP messages stored in the data buffer 54 to send the SMTP messages to the application executing section 57.

Besides, in the case where the data buffer 54 is full when the application data receiver 51 intends to store SMTP messages therein in response to the backpressure signal received from the application executing section 57, the application data receiver 51 cannot store the SMTP messages in the data buffer 54. Accordingly, the application data receiver 51 sends a backpressure signal to the L4 data receiver 41 in order to terminate the reception of SMTP messages from the L4 data receiver 41. On receipt of the backpressure signal, the L4 data receiver 41 stops sending SMTP messages to the application data receiver 51, and temporarily stores the SMTP messages in the data buffer 44.

[Function of Application Data Transmitter 52]

The application data transmitter 52 sends SMTP messages received from the application executing section 57 to the L4 data transmitter 42 of the L4 terminating unit 40. When having received a backpressure signal from the L4 data transmitter 42, the application data transmitter 52 stops sending SMTP messages to the L4 data transmitter 42, and temporarily stores the SMTP messages in the data buffer 54. At the instant that the backpressure signal ceases to be received, the application data transmitter 52 reads out the SMTP messages once stored in the data buffer 54 to send the SMTP messages to the L4 data transmitter 42.

[Function of Application Executing Section 57]

The application executing section 57 analyzes an SMTP message received from the application data receiver 51 or an SMTP message read out of the data buffer 54, and determines whether or not to transmit the SMTP message. Additionally, the application executing section 57 generates a new SMTP message. The application executing section 57 normally relays SMTP messages to the next network (SMTP relay processing). That is, the application executing section 57 forwards SMTP messages to the application data transmitter 52.

In the case where the application data transmitter 52 is processing other data and instructs the application executing section 57 to stop sending data thereto while the application executing section 57 is forwarding SMTP messages, the application executing section 57 temporarily stores the SMTP messages in the data buffer 54. When the application data transmitter 52 instructs the application executing section 57 to resume sending data, the application executing section 57 reads out the SMTP messages once stored in the data buffer 54 to send the SMTP messages to the L4 data transmitter 42 via the application data transmitter 52.

Incidentally, after storing the SMTP messages in the data buffer 54, the application executing section 57 may provide the application data transmitter 52 with SMTP message identification information for identifying the SMTP messages stored in the data buffer 54. In this case, when the application data transmitter 52 has come to accept data, the application data transmitter 52 reads out the SMTP messages stored in the data buffer 54 based on the SMTP message identification information received from the application executing section 57. Thereby, the application data transmitter 52 obtains the SMTP messages corresponding to the SMTP message identification information to send the SMTP messages to the L4 data transmitter 42.

Having analyzed an SMTP message, the application executing section 57 extracts information on SMTP transaction state and the source email address and destination email address from the SMTP message. Based on the SMTP transaction state information extracted from the SMTP message, the application executing section 57 manages the SMTP transaction in which SMTP relay processing is performed. The application executing section 57 sends the application data measuring section 53 the information on SMTP transaction state, and the source email address and destination email address extracted from the SMTP message.

Besides, the application executing section 57 collates the source email address and destination email address extracted from the SMTP message with addresses of email excluded from the subjects of regulation stored in the application pass-through list database 55 and addresses of email subject to regulation stored in the application regulation subject list database 56. Based on the result of the collation, the application executing section 57 decides on unconditional pass through, conditional pass through, or regulation operation.

When the source email address or destination email address extracted from the SMTP message matches one of the email addresses in the application pass-through list database 55, the application executing section 57 unconditionally performs SMTP relay processing for the SMTP message or SMTP transaction.

When neither the source email address nor destination email address extracted from the SMTP message match any of the email addresses in the application pass-through list database 55 and the application regulation subject list database 56, the application executing section 57 performs the SMTP relay processing for the SMTP message or SMTP transaction.

When neither the source email address nor destination email address extracted from the SMTP message match any of the email addresses in the application pass-through list database 55 and at least either of them matches one of the email addresses in the application regulation subject list database 56, the application executing section 57 refers to the regulation operation field in the application regulation subject list database 56 and selects one from a plurality of regulation operations such as "relay", "delay" and "discard" to perform the regulation operation for the SMTP message or SMTP transaction.

[Function of Application Data Measuring Section 53]

The application data measuring section 53 counts the number of email messages in an SMTP transaction with respect to each IP address based on information (information on SMTP transaction state, and the source email address and destination email address extracted from an SMTP message) sent from the application executing section 57. Further, the application data measuring section 53 counts the number of email commands, RCPT (receipient) commands and SMTP error responses in the SMTP transaction. Having determined that the count of any of the above is equal to or more than an individual predetermined value, the application data measuring section 53 informs the judging unit 60 of the SMTP transaction and measurement results for the SMTP transaction.

[Function of Data Buffer 54]

The data buffer 54 temporarily stores data used by the application data receiver 51, the application data transmitter 52, and the application executing section 57.

[Functions of Application Pass-Through List Database 55 and Application Regulation Subject List Database 56]

FIG. 8 is a diagram showing an example of the construction of the application pass-through list database 55. As shown in FIG. 8, the application pass-through list database 55 has essentially the same construction as described previously for the L3/L4 pass-through list database 35 except for the presence of the email address field for addresses of email excluded from the subjects of regulation. The application data receiver 51 and the application executing section 57 refer to the application pass-through list database 55.

FIG. 9 is a diagram showing an example of the construction of the application regulation subject list database 56 storing three types of information: the upper limit number of TCP connections for decision on the activation of regulation operation, the address of email to be regulated, and the upper limit number of email messages for decision on the activation of regulation operation. FIG. 10 is a diagram showing another example of the construction of the application regulation subject list database 56 storing information on the upper limit number of TCP connections for decision on the activation of regulation operation. FIG. 11 is a diagram showing yet another example of the construction of the application regulation subject list database 56 storing information on the address of email to be regulated and the upper limit number of email messages for decision on the activation of regulation operation. As can be seen in FIGS. 9 to 11, the application regulation subject list database 56 includes, in addition to the fields of the L3/L4 regulation subject list database 36, at least one selected from a field for the upper limit number of TCP connections (TCP Connection Count), a field for the address of email to be regulated (Email address), and a field for the upper limit number of email messages (Email Count). The application data receiver 51 and the application executing section 57 refer to the application regulation subject list database 56.

[Construction of Judging Unit 60]

The judging unit 60 is connected with the traffic controller 30, the L4 terminating unit 40, and the application processor 50.

The judging unit 60 comprises a judgment logic section 61, a pass-through list database 65, a regulation subject list database 66, and a regulation subject management list database 67.

The judging unit 60 collects measurement information of each layer sent from the L3 data measuring section 33, the L4 data measuring section 43 and the application data measuring section 53. Based on the measurement information, the judging unit 60 determines the subjects of regulation according to the IP address, TCP connection, SMTP transaction and/or email address. Subsequently, the judging unit 60 sends the judgment result to the traffic controller 30, the L4 terminating unit 40 and the application processor 50 to instruct them to perform regulation operation.

[Function of Pass-Through List Database 65]

The pass-through list database 65 is a master database of the L3/L4 pass-through list database 35 in the traffic controller 30 and the application pass-through list database 55 in the application processor 50, and provides a combination of the databases 35 and 55. The application pass-through list in the application pass-through list database 65 is set by the user of the application band control device 1. The application pass-through list is separated into the L3/L4 pass-through list and the application pass-through list, which are stored in the L3/L4 pass-through list database 35 in the traffic controller 30 and the application pass-through list database 55 in the application processor 50, respectively.

[Function of Regulation Subject List Database 66]

The regulation subject list database 66 is a master database of the L3/L4 regulation subject list database 36 in the traffic controller 30 and the application regulation subject list database 56 in the application processor 50, and provides a combination of the databases 36 and 56. The regulation subject list in the regulation subject list database 66 is a dynamic list for managing IP addresses, TCP connections and SMTP transactions subject to regulation in the application band control device 1.

[Function of Regulation Subject Management List Database 67]

The regulation subject management list database 67 receives IP address information from the L3 data measuring section 33, TCP connection information from the L4 data measuring section 43, and SMTP transaction information from the application data measuring section 53, and manages the received information.

[Function of Judgment Logic Section 61]

The judgment logic section 61 collates information from the L3 data measuring section 33 (IP header information and TCP header information), information from the L4 data measuring section 43 (TCP connection information and TCP connection open and close information), and information from the application data measuring section 53 (SMTP transaction information and measurement information for each SMTP transaction) with the regulation subject list in the regulation subject list database 66. Thereby, the judgment logic section 61 determines whether or not a relevant SMTP transaction corresponds to traffic subject to regulation.

Having determined that the SMTP transaction is traffic subject to regulation, the judgment logic section 61 adds the IP address information, TCP connection information, and SMTP transaction information corresponding to the SMTP transaction to the regulation subject management list database 67. In addition, the judgment logic section 61 refers to the regulation operation field in the regulation subject list database 66 to instruct the traffic controller 30, the L4 terminating unit 40 and/or the application processor 50 to perform regulation operation based on the IP address, TCP connection, SMTP transaction and/or email address.

[Operation of Application Band Control Device 1]

FIG. 12 is a flowchart showing the operation of the application band control device according to the first embodiment of the present invention. In the following, a description will be given of the band control by the application band control device 1 referring to FIG. 12.

First, the network interface 20 receives packet data via the input ports 21 or 22 from a communication apparatus (step S1). The network interface 20 sends the packet data to the L3 data receiver 31 in the traffic controller 30. Using an SMTP traffic filter (not shown) provided to the L3 data receiver 31, the receiver 31 filters the packet data received from the network interface 20 to determine whether or not the packet data is SMTP packet data (step S2).

Having determined that the packet data sent from the network interface 20 is SMTP packet data (step S2/SMTP), the L3 data receiver 31 refers to the L3/L4 pass-through list database 35 to determine whether or not the SMTP packet data corresponds to any of IP addresses and TCP connection information of data excluded from the subjects of regulation stored in the database 35 (step S3).

Incidentally, the L3 data receiver 31 determines that packet data is SMTP packet data when the packet data is TCP packet data and its SP (Source Port number) or DP (Destination Port number) corresponds to SMTP (=25). When the packet data does not meet the above conditions (step S2/NO SMTP), the L3 data receiver 31 allows the packet data to pass through the data buffer 34 to the L3 data transmitter 32 (step S5). The L3 data transmitter 32 sends the packet data to the network interface 20 (step S11).

Having determined that the SMTP packet data corresponds to any of IP addresses and TCP connection information of data excluded from the subjects of regulation stored in the L3/L4 pass-through list database 35 (step S3/Hit), the L3 data receiver 31 regards the SMTP packet data as pass-through packet data. Accordingly, the data receiver 31 allows the SMTP packet data to pass through the data buffer 34 to the L3 data transmitter 32 (step S5). The L3 data transmitter 32 sends the SMTP packet data to the network interface 20 (step S11).

On the other hand, when having determined that the SMTP packet data does not correspond to any of IP addresses and TCP connection information of data excluded from the subjects of regulation stored in the L3/L4 pass-through list database 35 (step S31 NO Hit), the L3 data receiver 31 regards the SMTP packet data as packet data subject to regulation. In this case, the L3 data receiver 31 determines which the SMTP packet data belongs to, SP or DP (step S4).

Having determined that the SMTP packet data belongs to SP (step S4/SP=SMTP), the L3 data receiver 31 regards the SMTP packet data as packet data containing an SMTP command response (SP=SMTP: SMTP command response). The SMTP packet data is not dealt with as packet data subject to regulation. However, the SMTP packet data is to be monitored (SMTP monitoring) at the application processor 50 to manage the SMTP state transition (step S9-1).

On the other hand, when having determined that the SMTP packet data belongs to DP (step S4/DP=SMTP), the L3 data receiver 31 regards the SMTP packet data as packet data which constitutes an SMTP command and mail data (DP=SMTP: SMTP command and mail data). The SMTP packet data is dealt with as packet data subject to regulation. The L3 data receiver 31 refers to the L3/L4 regulation subject list database 36 to determine whether or not the SMTP packet data corresponds to any of IP addresses and TCP connection information of regulation subject data stored in the database 36 (step S6).

When the L3 data receiver 31 has determined that the SMTP packet data does not correspond to any of IP addresses and TCP connection information of regulation subject data stored in the L3/L4 regulation subject list database 36 (step S6/NO Hit), the SMTP packet data is to be monitored (SMTP monitoring) at the application processor 50 (step S9-1).

On the other hand, when the L3 data receiver 31 has determined that the SMTP packet data corresponds to any of IP addresses and TCP connection information of regulation subject data stored in the L3/L4 regulation subject list database 36 (step S6/Hit), the SMTP packet data is subjected to regulation operation such as the limitation of the number of connections (step S7) and policing (step S8). After that, the SMTP packet data is to be monitored (SMTP monitoring) at the application processor 50 (step S9-2).

Incidentally, the L4 terminating unit 40 limits the number of connections in step S7, while the L3 data receiver 31 performs the policing in step S8.

Besides, based on the SMTP monitoring in steps S9-1 and S9-2, the statistical information of SMTP traffic is corrected with respect to each IP address and TCP connection by the application data measuring section 53. After the SMTP monitoring in step S9-2, the SMTP packet data is subjected to regulation operation: delay addition/shaping in the L3 data transmitter 32 (step S10).

The SMTP packet data, which has undergone the SMTP monitoring in step S9-1 and/or delay addition/shaping in step S10, is sent to the network interface 20 (step S11).

The statistical information corrected by the SMTP monitoring in steps S9-1 and S9-2 is fed to the judging unit 60. The judging unit 60 determines whether or not the SMTP packet data corresponds to traffic subject to regulation. When the judging unit 60 has determined that the SMTP packet data corresponds to traffic subject to regulation, the regulation subject list reference in step S6, the limitation of the number of connections in step S7, the policing in step S8, and/or delay addition/shaping in step S10 is/are performed (step S12).

Incidentally, the traffic controller 30, L4 terminating unit 40, application processor 50 and judging unit 60 included in the application band control device 1 may be implemented in dedicated hardware and firmware, or a general-purpose CPU (Central Processing Unit) and software.

As is described above, in the application band control device 1 according to the first embodiment of the present invention, the application processor 50 checks the contents of application layer data to detect regulation subject data, and the traffic and/or connection with respect to the regulation subject data are/is controlled by the traffic controller 30 at the L3 level and the L4 terminating unit 40 at the L4 level, respectively. By virtue of this construction, the application band control device 1 of the first embodiment can considerably improve processing capacity as compared to the case where the transaction is controlled in the application processor 50 at the application layer level. For example, the application band control device 1 of the first embodiment is capable of regulating email, which is delivered to an unspecified number of users indiscriminately, in various types of SMTP traffic.

In the following, a description will be given of an application band control device according to the second embodiment of the present invention.

The application band control device of the second embodiment retrieves, in addition to the operation of the application band control device of the first embodiment previously described, a source email address (Mail From) and one or more destination email addresses (RCPT-To) in an SMTP transaction. Based on the source email address (Mail From) and one or more destination email addresses (RCPT-To) in the SMTP transaction, the application band control device counts the number of email messages with respect to each email address. Thus the application band control device regulates email delivery according to the email address based on the number of email messages with respect to each email address.

Incidentally, the application band control device of the second embodiment has essentially the same construction as described previously for that of the first embodiment in connection with FIG. 5. According to the second embodiment, the application executing section 57 retrieves a source email address (Mail From) and one or more destination email addresses (RCPT-To) in an SMTP transaction, and sends the source email address (Mail From) and one or more destination email addresses (RCPT-To) to the application data measuring section 53. The application data measuring section 53 counts the number of email messages with respect to each email address based on the source email address (Mail From) and one or more destination email addresses (RCPT-To). Subsequently, the application data measuring section 53 informs the judging unit 60 of the number of email messages thus obtained. The judging unit 60 updates the regulation subject management list database 67, and checks the pass-through list database 65 and the regulation subject list database 66 based on the number of email messages with respect to each email address informed by the application data measuring section 53. Accordingly, the judging unit 60 regulates email delivery based on the email address. Thus, the application band control device 1 of the second embodiment can identify email sent from a specific user more precisely to regulate the transmission of the email.

In the following, a description will be given of an application band control device according to the third embodiment of the present invention.

As in the second embodiment, the application band control device of the third embodiment has essentially the same construction as described previously for that of the first embodiment in connection with FIG. 5. According to the third embodiment, the application data measuring section 53 counts the number of destination email addresses in an SMTP transaction with respect to each IP address based on information (SMTP transaction state, and a source email address and one or more destination email addresses in the SMTP transaction) sent from the application executing section 57. The application data measuring section 53 informs the judging unit 60 of the number of destination email addresses thus obtained. The judging unit 60 updates the regulation subject management list database 67, and checks the pass-through list database 65 and the regulation subject list database 66 based on the number of destination email addresses in the SMTP transaction with respect to each IP address informed by the application data measuring section 53. Accordingly, the judging unit 60 regulates email delivery based on the IP address, and limits the number of destination email addresses in one transaction. Thus, the application band control device 1 of the third embodiment can identify email sent from a specific user more precisely to regulate the transmission of the email.

In the following, a description will be given of an application band control device according to the forth embodiment of the present invention.

Except that the L3 data measuring section 33 has a counting function for counting the number of packets with respect to each IP address and the number of packets with respect to each TCP connection, the application band control device of the fourth embodiment is essentially similar to that of the first embodiment shown in FIG. 5. With this construction, the volume of traffic can be more closely monitored.

In the following, a description will be given of an application band control device according to the fifth embodiment of the present invention.

Except for the operation in step S10 shown in FIG. 12, the application band control device of the fifth embodiment operates in essentially the same manner as that of the first embodiment shown in FIG. 5. According to the fifth embodiment, IP packet-level processing: delay addition/shaping, by the L3 data receiver 31 in step S10 of FIG. 12 is replaced by the addition of delay to TCP ACK/the change of TCP window size in the L4 data receiver 41 and the L4 data transmitter 42. Thus, a specific TCP connection can be regulated according to the volume of traffic caused by email sent from a specific user.

In the following, a description will be given of an application band control device according to the sixth embodiment of the present invention.

Except for the operation in step S10 shown in FIG. 12, the application band control device of the sixth embodiment operates in essentially the same manner as that of the first embodiment shown in FIG. 5. According to the sixth embodiment, IP packet-level processing: delay addition/shaping, by the L3 data receiver 31 in step S10 of FIG. 12 is replaced by the addition of delay to an SMTP command response in the application executing section 57. Thus, a specific SMTP transaction can be regulated according to the volume of traffic caused by email sent from a specific user.

In the following, a description will be given of an application band control device according to the seventh embodiment of the present invention.

Except for the operation in step S7 shown in FIG. 12, the application band control device of the seventh embodiment operates in essentially the same manner as that of the first embodiment shown in FIG. 5. According to the seventh embodiment, the limitation of the number of connections in step S7 of FIG. 12 is replaced by regulation operation for an SMTP transaction at the application executing section 57. Thus, it is possible to limit the volume of traffic caused by email sent from a specific information processor.

In the following, a description will be given of an application band control device according to the eighth embodiment of the present invention.

In the application band control device of the eighth embodiment, by instructions from the judging unit 60 shown in FIG. 5, the application executing section 57 regulates a specific SMTP transaction, the application data receiver 51 regulates the reception of an SMTP transaction from a specific source address, and the application data transmitter 52 regulates the transmission of an SMTP transaction to a specific destination address. Thus, it is possible to limit the volume of traffic caused by email sent from a specific information processor.

Incidentally, the operation of the application band control device according to the above embodiments may be implemented by a computer program. In such a case, an information processor reads the program stored in a storage medium, such as an optical storage medium, a magnetic storage medium, a magneto-optic storage medium and a semiconductor or reads the program from an external device via a prescribed network to execute the program. Thereby, the information processor can implement the aforementioned operation of the application band control device. While the above description of the application band control device has been given in the case of IP as the L3 protocol, TCP as the L4 protocol and SMTP as the application layer protocol, other protocols may be used as respective layer protocols.

As set forth hereinabove, in accordance with the present invention, a band control device checks or scans the contents of application level data to detect regulation subject data. When regulation subject data has been detected, the band control device controls at least one selected from L3 traffic, an L4 connection and an application level transaction with respect to the regulation subject data. Thus, specific application level traffic is autonomously regulated so that network resources can be fairly utilized.

Moreover, the band control device, band control method and band control program of the present invention may be applied to a network device placed between information processors connected via a network, such as a bridge, a router and a gateway.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A band control device placed between information processors connected via a network, comprising:
   a regulation subject detector for checking the contents of application level data sent from the information processors to detect data subject to regulation; and
   a regulation subject controller for, when regulation subject data has been detected by the regulation subject detector, controlling at least one of a group selected from L3 (Layer3) traffic, an L4 (Layer4) connection and an application level transaction with respect to the regulation subject data, wherein the regulation subject controller prevents traffic caused by a new application level transaction corresponding to the detected regulation subject data from passing through, refuses to establish a session for the detected regulation subject data when the termination process is being performed at the application layer level, limits the band for the L3 traffic or L4 traffic of the detected regulation subject data to a predetermined value or less, and/or adds a predetermined value of delay to the detected regulation subject data so as to increase application level processing time for the regulation subject data.

2. The band control device claimed in claim 1, further comprising a state transition monitor for monitoring the state transition of application level data, wherein:
   when regulation subject data has been detected based on the monitoring by the state transition monitor, the regulation subject controller controls at least one selected from L3 traffic, an L4 connection and an application level transaction with respect to the regulation subject data.

3. The band control device claimed in claim 2, further comprising a regulation subject setting unit for setting regulation subject data.

4. The band control device claimed in claim 2, further comprising:

a first regulation subject exclusion unit for excluding packet data not including a port number for SMTP from the subjects of regulation;

a second regulation subject exclusion unit for excluding packet data including a port number for SMTP and a specific IP address as a source address or a destination address from the subjects of regulation; and/or a third regulation subject exclusion unit for excluding packet data including a specific email address from the subjects of regulation.

5. The band control device claimed in claim 2, wherein data is to be regulated on the conditions as follows:

when the volume of data traffic from a specific L3 address exceeds a predetermined value;

when the number of L4 connections from a specific L3 address exceeds a predetermined value;

when an information processor has been identified as the subject of monitoring at the application layer level, and the volume of data traffic from the information processor under monitoring exceeds a predetermined value;

when the number of L4 connections from a specific information processor exceeds a predetermined value; and/or when the number of application level transactions from a specific information processor exceeds a predetermined value.

6. The band control device claimed in claim 2, wherein the regulation subject controller prevents traffic caused by a new application level transaction corresponding to the detected regulation subject data from passing through, refuses to establish a session for the detected regulation subject data when the termination process is being performed at the application layer level, limits the band for the L3 traffic or L4 connection of the detected regulation subject data to a predetermined value or less, and/or adds a predetermined value of delay to the detected regulation subject data so as to increase application level processing time for the regulation subject data.

7. The band control device claimed in claim 2, wherein the control of regulation subject data includes IP level control, TCP level control and SMTP level control.

8. The band control device claimed in claim 1, further comprising a regulation subject setting unit for setting regulation subject data.

9. The band control device claimed in claim 1, further comprising:

a first regulation subject exclusion unit for excluding packet data not including a port number for SMTP from the subjects of regulation;

a second regulation subject exclusion unit for excluding packet data including a port number for SMTP and a specific IP address as a source address or a destination address from the subjects of regulation; and/or a third regulation subject exclusion unit for excluding packet data including a specific email address from the subjects of regulation.

10. The band control device claimed in claim 1, wherein data is to be regulated on the conditions as follows:

when the volume of data traffic from a specific L3 address exceeds a predetermined value;

when the number of L4 connections from a specific L3 address exceeds a predetermined value;

when an information processor has been identified as the subject of monitoring at the application layer level, and the volume of data traffic from the information processor under monitoring exceeds a predetermined value;

when the number of L4 connections from a specific information processor exceeds a predetermined value; and/or when the number of application level transactions from a specific information processor exceeds a predetermined value.

11. The band control device claimed claim 1, wherein the control of regulation subject data includes IP level control, TCP level control and SMTP level control.

12. The band control device claimed in claim 11, wherein the IP level control of regulation subject data includes the discard of IP packet data, the addition of delay to IP packet data and the band limitation of IP packet data.

13. The band control device claimed in claim 11, wherein the TCP level control of regulation subject data includes the termination of a TCP connection, the limitation of the number of TCP connections and the addition of delay to TCP ACK.

14. The band control device claimed in claim 11, wherein the SMTP level control of regulation subject data includes the forced termination of an SMTP transaction, the limitation of the number of SMTP transactions and the addition of delay to an SMTP command response.

15. In a band control device placed between information processors connected a band control method via a network, comprising the steps of:

checking the contents of application level data sent from the information processors to detect regulation subject data; and when regulation subject data has been detected, controlling at least one of a group selected from L3 (Layer 3) traffic, an L4 (Layer 4) connection and an application level transaction with respect to the regulation subject data, wherein, in the step of controlling regulation subject data, the band control device prevents traffic caused by a new application level transaction corresponding to the detected regulation subject data from passing through, refuses to establish a session for the detected regulation subject data when the termination process is being performed at the application layer level, limits the band for the L3 traffic or L4 connection of the detected regulation subject data to a predetermined value or less, and/or adds a predetermined value of delay to the detected regulation subject data so as to increase application level processing time for the regulation subject data.

16. The band control method claimed in claim 15, further comprising the step of monitoring the state transition of application level data, wherein:

when regulation subject data has been detected based on the monitoring, the band control device controls at least one selected from L3 traffic, an L4 connection and an application level transaction with respect to the regulation subject data.

17. The band control method claimed in claim 16, further comprising the step of setting regulation subject data, wherein:

the band control device checks the contents of application level data sent from the information processors to detect regulation subject data based on the setting.

18. The band control method claimed in claim 16, wherein data is to be regulated on the conditions as follows:

when the volume of data traffic from a specific L3 address exceeds a predetermined value;

when the number of L4 connections from a specific L3 address exceeds a predetermined value;

when an information processor has been identified as the subject of monitoring at the application layer level, and the volume of data traffic from the information processor under monitoring exceeds a predetermined value;

when the number of L4 connections from a specific information processor exceeds a predetermined value; and/or when the number of application level transactions from a specific information processor exceeds a predetermined value.

19. The band control method claimed in claim 16, further comprising the steps of:
excluding packet data not including a port number for SMTP from the subjects of regulation;
excluding packet data including a port number for SMTP and a specific IP address as a source address or a destination address from the subjects of regulation; and/or
excluding packet data including a specific email address from the subjects of regulation.

20. The band control method claimed in claim 16, wherein, in the step of controlling regulation subject data, the band control device prevents traffic caused by a new application level transaction corresponding to the detected regulation subject data from passing through, refuses to establish a session for the detected regulation subject data when the termination process is being performed at the application layer level, limits the band for the L3 traffic or L4 connection of the detected regulation subject data to a predetermined value or less, and/or adds a predetermined value of delay to the detected regulation subject data so as to increase application level processing time for the regulation subject data.

21. The band control method claimed in claim 16, wherein the control of regulation subject data includes IP level control, TCP level control and SMTP level control.

22. The band control method claimed in claim 15, further comprising the step of setting regulation subject data, wherein:
the band control device checks the contents of application level data sent from the information processors to detect regulation subject data based on the setting.

23. The band control method claimed in claim 15, further comprising the steps of:
excluding packet data not including a port number for SMTP from the subjects of regulation;
excluding packet data including a port number for SMTP and a specific IP address as a source address or a destination address from the subjects of regulation; and/or
excluding packet data including a specific email address from the subjects of regulation.

24. The band control method claimed in claim 15, wherein data is to be regulated on the conditions as follows:
when the volume of data traffic from a specific L3 address exceeds a predetermined value;
when the number of L4 connections from a specific L3 address exceeds a predetermined value;
when an information processor has been identified as the subject of monitoring at the application layer level, and the volume of data traffic from the information processor under monitoring exceeds a predetermined value;
when the number of L4 connections from a specific information processor exceeds a predetermined value; and/or
when the number of application level transactions from a specific information processor exceeds a predetermined value.

25. The band control method claimed in claim 15, wherein the control of regulation subject data includes IP level control, TCP level control and SMTP level control.

26. The band control method claimed in claim 25, wherein the IP level control of regulation subject data includes the discard of IP packet data, the addition of delay to IP packet data and the band limitation of IP packet data.

27. The band control method claimed in claim 25, wherein the TCP level control of regulation subject data includes the termination of a TCP connection, the limitation of the number of TCP connections and the addition of delay to TCP ACK.

28. The band control method claimed in claim 25, wherein the SMTP level control of regulation subject data includes the forced termination of an SMTP transaction, the limitation of the number of SMTP transactions and the addition of delay to an SMTP command response.

29. A band control program stored on a storage medium and executed by a processing unit in a band control device placed between information processors connected via a network, for performing the processes of:
checking the contents of application level data sent from the information processors to detect regulation subject data; and
when regulation subject data has been detected, controlling at least one of a group selected from L3 (Layer 3) traffic, an L4 (Layer 4) connection and an application level transaction with respect to the regulation subject data, wherein, in the process of controlling regulation subject data, the band control device prevents traffic caused by a new application level transaction corresponding to the detected regulation subject data from passing through, refuses to establish a session for the detected regulation subject data when the termination process is being performed at the application layer level, limits the band for the L3 traffic or L4 traffic of the detected regulation subject data to a predetermined value or less, and/or adds a predetermined value of delay to the detected regulation subject data so as to increase application level processing time for the regulation subject data.

30. The band control program claimed in claim 29, further performing the process of monitoring the state transition of application level data, wherein:
when regulation subject data has been detected based on the monitoring, the band control device controls at least one selected from L3 traffic, an L4 connection and an application level transaction with respect to the regulation subject data.

31. The band control program claimed in claim 30, further performing the process of setting regulation subject data, wherein:
the band control device checks the contents of application level data sent from the information processors to detect regulation subject data based on the setting.

32. The band control program claimed in claim 30, further performing the processes of:
excluding packet data not including a port number for SMTP from the subjects of regulation;
excluding packet data including a port number for SMTP and a specific IP address as a source address or a destination address from the subjects of regulation; and/or
excluding packet data including a specific email address from the subjects of regulation.

33. The band control program claimed in claim 30, wherein data is to be regulated on the conditions as follows:
when the volume of data traffic from a specific L3 address exceeds a predetermined value;
when the number of L4 connections from a specific L3 address exceeds a predetermined value;
when an information processor has been identified as the subject of monitoring at the application layer level, and the volume of data traffic from the information processor under monitoring exceeds a predetermined value;
when the number of L4 connections from a specific information processor exceeds a predetermined value and/or when the number of application level transactions from a specific information processor exceeds a predetermined value.

34. The band control program claimed in claim 30, wherein, in the process of controlling regulation subject data, the band control device prevents traffic caused by a new application level transaction corresponding to the detected regulation subject data from passing through, refuses to establish a session for the detected regulation subject data when the termination process is being performed at the application layer level, limits the band for the L3 traffic or L4 connection of the detected regulation subject data to a predetermined value or less, and/or adds a predetermined value of delay to the detected regulation subject data so as to increase application level processing time for the regulation subject data.

35. The band control program claimed in claim 30, wherein the control of regulation subject data includes IP level control, TCP level control and SMTP level control.

36. The band control program claimed in claim 29, further performing the process of setting regulation subject data, wherein:
the band control device checks the contents of application level data sent from the information processors to detect regulation subject data based on the setting.

37. The band control program claimed in claim 29, further performing the processes of:
excluding packet data not including a port number for SMTP from the subjects of regulation;
excluding packet data including a port number for SMTP and a specific IP address as a source address or a destination address from the subjects of regulation; and/or
excluding packet data including a specific email address from the subjects of regulation.

38. The band control program claimed in claim 29, wherein data is to be regulated on the conditions as follows:
when the volume of data traffic from a specific L3 address exceeds a predetermined value;
when the number of L4 connections from a specific L3 address exceeds a predetermined value;
when an information processor has been identified as the subject of monitoring at the application layer level, and the volume of data traffic from the information processor under monitoring exceeds a predetermined value;
when the number of L4 connections from a specific information processor exceeds a predetermined value and/or
when the number of application level transactions from a specific information processor exceeds a predetermined value.

39. The band control program claimed in claim 29, wherein the control of regulation subject data includes IP level control, TCP level control and SMTP level control.

40. The band control program claimed in claim 39, wherein the IP level control of regulation subject data includes the discard of IP packet data, the addition of delay to IP packet data and the band limitation of IP packet data.

41. The band control program claimed in claim 39, wherein the TCP level control of regulation subject data includes the termination of a TCP connection, the limitation of the number of TCP connections and the addition of delay to TCP ACK.

42. The band control program claimed in claim 39, wherein the SMTP level control of regulation subject data includes the forced termination of an SMTP transaction, the limitation of the number of SMTP transactions and the addition of delay to an SMTP command response.

* * * * *